(12) United States Patent
Staat et al.

(10) Patent No.: US 12,296,416 B2
(45) Date of Patent: May 13, 2025

(54) AUTOMATED CLIP INSTALLATION SYSTEM

(71) Applicant: West Michigan Innovations, LLC, Holland, MI (US)

(72) Inventors: Colin B. Staat, Holland, MI (US); Craig Ponstein, West Olive, MI (US)

(73) Assignee: West Michigan Innovations, LLC, Holland, MI (US)

( * ) Notice: Subject to any disclaimer, the term of this patent is extended or adjusted under 35 U.S.C. 154(b) by 187 days.

(21) Appl. No.: 18/092,550

(22) Filed: Jan. 3, 2023

(65) Prior Publication Data

US 2023/0321773 A1 Oct. 12, 2023

Related U.S. Application Data

(60) Provisional application No. 63/362,692, filed on Apr. 8, 2022.

(51) Int. Cl.
*B23P 19/00* (2006.01)

(52) U.S. Cl.
CPC ......... *B23P 19/002* (2013.01); *B23P 2700/50* (2013.01)

(58) Field of Classification Search
CPC .......................... B23P 19/002; B23P 2700/50
See application file for complete search history.

(56) References Cited

U.S. PATENT DOCUMENTS

| 4,582,236 | A | * | 4/1986 | Hirose | B29C 66/81429 227/67 |
|---|---|---|---|---|---|
| 5,014,876 | A | * | 5/1991 | Young | B23P 19/003 221/268 |
| 5,031,489 | A | * | 7/1991 | Young | B25C 1/001 227/112 |
| 2015/0076204 | A1 | * | 3/2015 | Maltais | B25C 5/13 227/120 |

* cited by examiner

*Primary Examiner* — Michelle Lopez
(74) *Attorney, Agent, or Firm* — Price Heneveld LLP

(57) ABSTRACT

An apparatus for installing a fastener includes a structure having an entry and an exit for the fastener. The structure further defines a channel having a passage, a chute for receiving the fastener, and a chamber between the chute and the passage. A feeder is operably coupled with the chute and configured to provide the fastener at the entry. A first actuator is operably coupled with the structure and configured to move the fastener through the chamber. A second actuator is operably coupled with the housing and configured to move the fastener through the passage to the exit.

19 Claims, 10 Drawing Sheets

AUTOMATED CLIP INSTALLATION SYSTEM

CROSS-REFERENCE TO RELATED APPLICATIONS

This application claims priority under 35 U.S.C. § 119e to U.S. provisional application No. 63/362,692 filed on Apr. 8, 2022, entitled "Automated Clip Installation System," the disclosure of which is hereby incorporated by reference in its entirety.

FIELD OF THE DISCLOSURE

The present disclosure generally relates to clip feeding systems and, more particularly, to automated clip installation systems.

BACKGROUND OF THE DISCLOSURE

Conventional vibratory bowl and blow feeding systems for clip installation systems blow only one clip at a time, causing delays in manufacturing. Typical clip installation systems have more moving components that create high wear items that need replacing. Clips are required in confined spaces, and existing systems interfere with part geometry. Typical clip installation systems have jaws that cause jamming and space confinement issues, and limit clips from accumulating near a point of installation.

SUMMARY OF THE DISCLOSURE

According to one aspect of the present disclosure, an apparatus for installing a fastener includes a structure having an entry and an exit for the fastener. The structure further defines a channel having a passage, a chute for receiving the fastener, and a chamber between the chute and the passage. A feeder is operably coupled with the chute and configured to provide the fastener at the entry. A first actuator is operably coupled with the structure and configured to move the fastener through the chamber. A second actuator is operably coupled with the housing and configured to move the fastener through the passage to the exit.

According to another aspect of the present disclosure, an apparatus for installing a fastener includes a structure having an entry and an exit for the fastener. The structure further defines a channel having a passage, a chute for receiving the fasteners, and a chamber between the chute and the passage. A first pneumatic cylinder is configured to push the fastener through the chamber. A second pneumatic cylinder is configured to push the fastener through the passage to the exit. The fastener is elastically deformable between a compressed position and an expanded position. A width of the passage is less than a width of the fastener in the expanded position.

According to another aspect of the present disclosure, a clip installation machine includes a structure having an entry and an exit for a plurality of clips. The structure further defines a channel having a passage, a chute accumulating the plurality of clips, and a chamber between the chute and the passage. A feeder is operably coupled with the chute and configured to load the plurality of clips into the chute. A first actuator is operably coupled with the structure and configured to selectively extend to move a first clip of the plurality of clips into the passage and retract to allow a second clip of the plurality of clips to move into the chamber. A second actuator is nonparallel with the first actuator and is configured to selectively extend to move the first clip toward the exit. Each of the plurality of clips is elastically deformable between a compressed position and an expanded position. A width of the passage is less than a width of each of the plurality of clips in the expanded position.

These and other features, advantages, and objects of the present disclosure will be further understood and appreciated by those skilled in the air by reference to the following specification, claims, and appended drawings.

Figure 1:
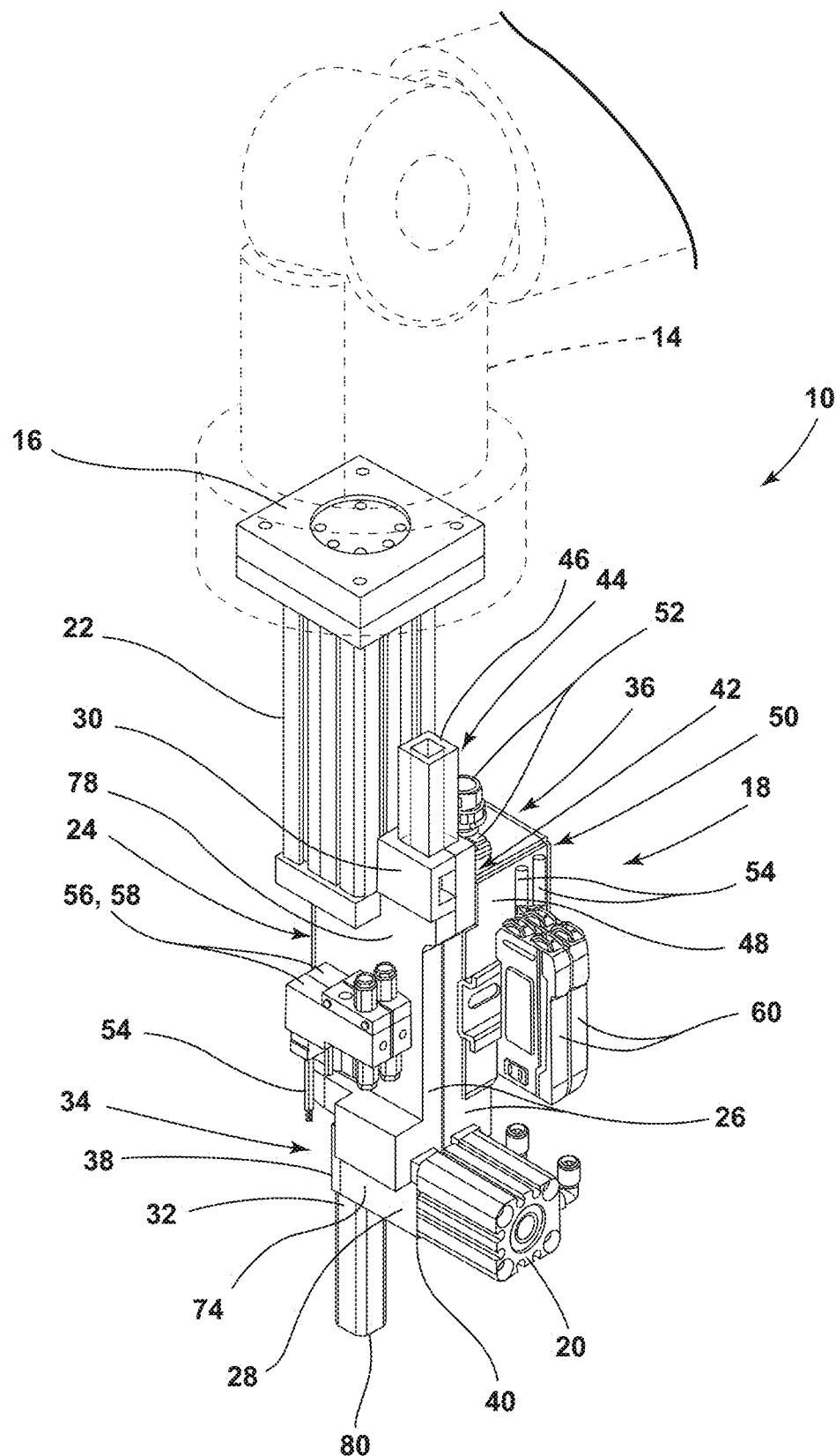
FIG. 1 is a perspective view of an apparatus for installing a fastener according to one aspect of the present disclosure.

The components in the figures are not necessarily to scale, emphasis instead being placed upon illustrating the principles described herein.

DETAILED DESCRIPTION OF THE DISCLOSURE

The present illustrated embodiments reside primarily in combinations of method steps and apparatus components related to an automated clip installation system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-9, reference numeral 10 generally designates an installation apparatus 10 for installing fasteners 12 on a working part, such as a plastic component for a vehicle. The apparatus 10 may be mounted to or otherwise coupled with another automated device, such as a robotic arm 14 of a robot as exemplarily illustrated. In general, the apparatus 10 of the present disclosure may be configured to install the fasteners 12 from an upright orientation, such that, in operation, the fasteners 12 project downwardly from the apparatus 10 in operation. Although a generally vertical arrangement is shown and described herein, it is contemplated that the apparatus 10 may be oriented laterally, or horizontally, or any other orientation that allows accumulation and loading of the fasteners 12 in the apparatus 10 and installation by the apparatus 10.

Figure 2:
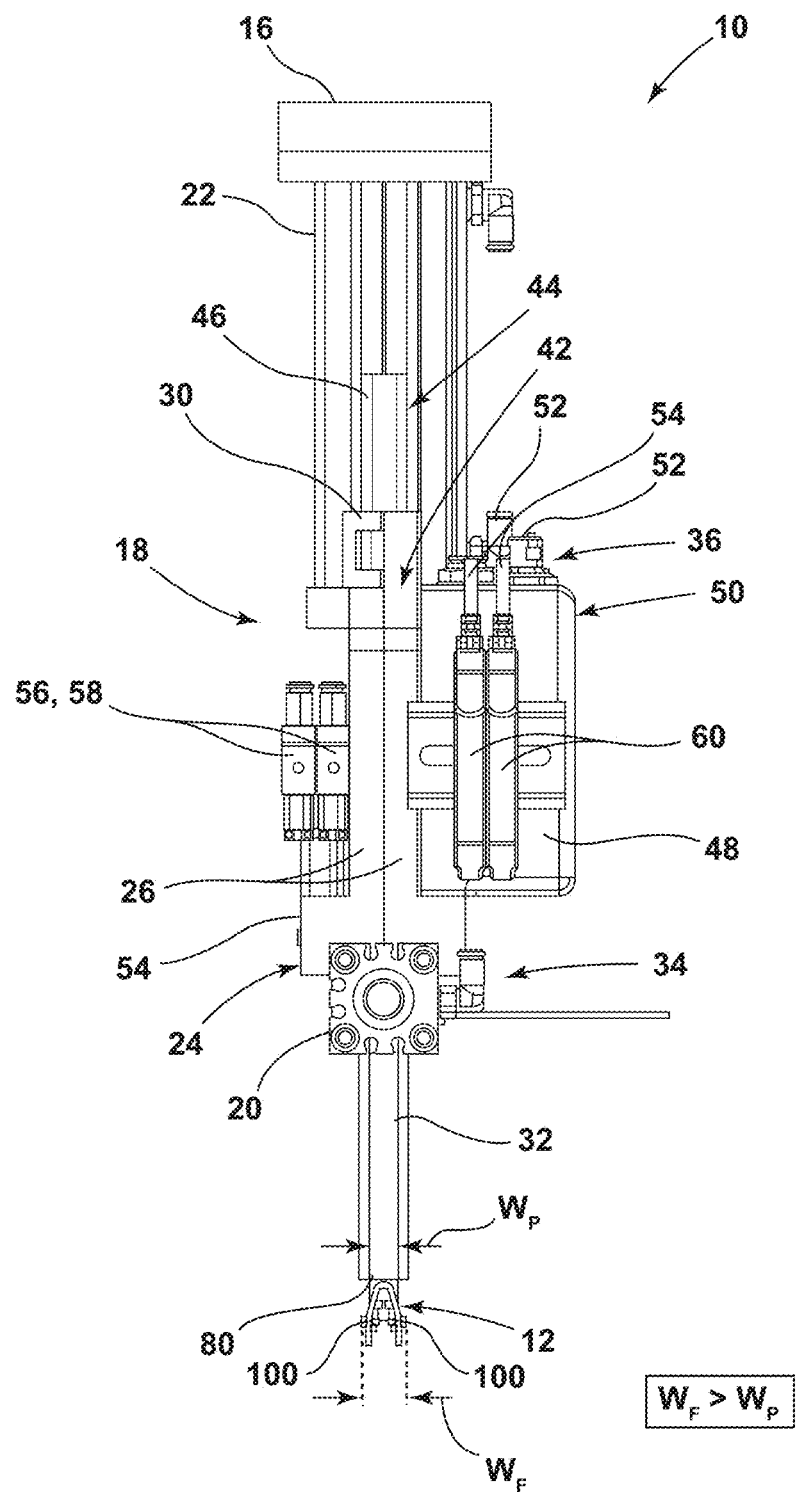
FIG. 2 is a front elevational view of the apparatus of FIG. 1.
Figure 3:
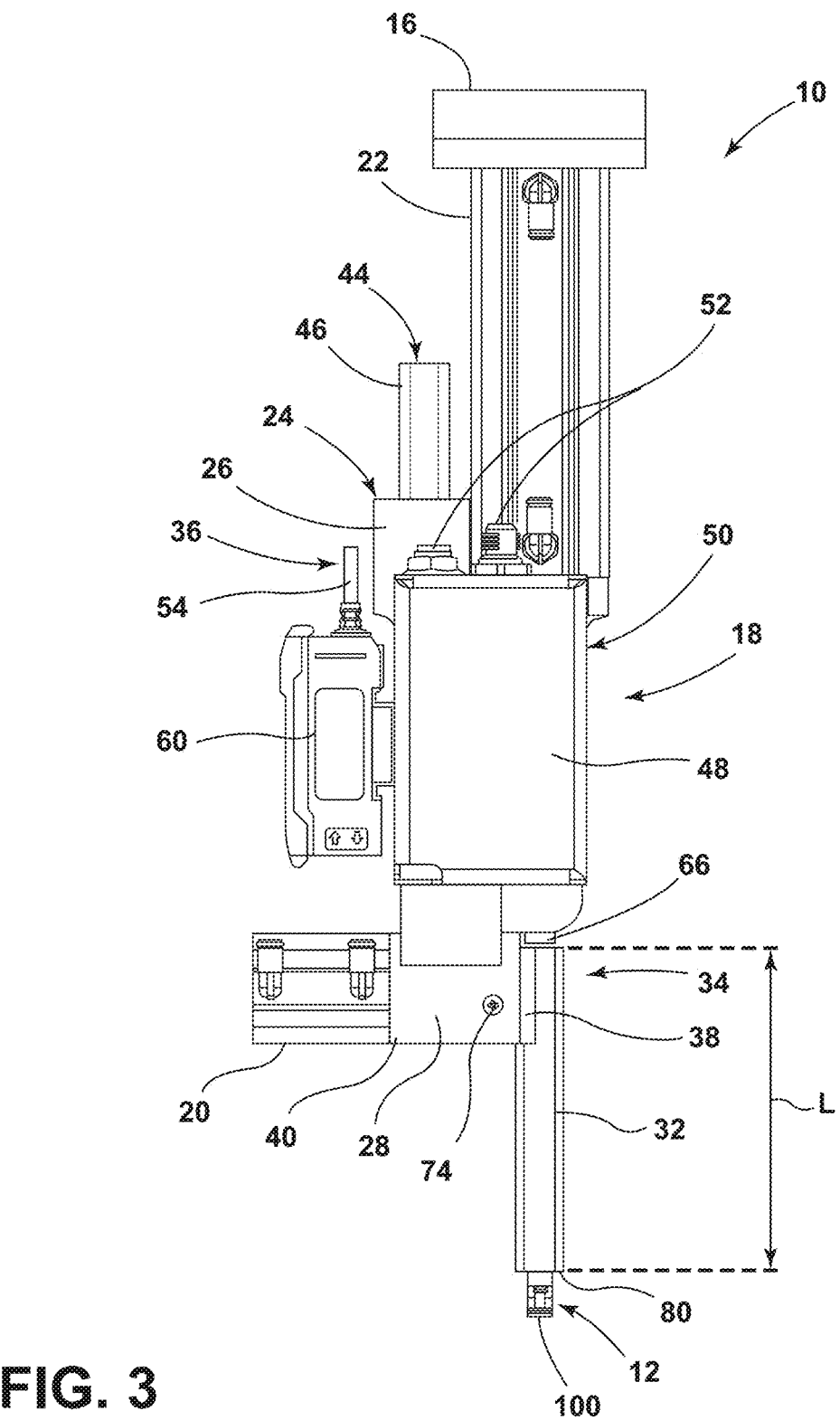
FIG. 3 is a side elevational view of the apparatus illustrated in FIG. 1.

Referring now more particularly to FIGS. 1-3, the apparatus 10 includes a mounting plate 16 that is configured to interpose a fixture (e.g., the robotic arm 14) and another portion of the apparatus 10. For example, the apparatus 10 includes a structure 18 that includes an assembly of plates and support members to which a pair of actuators 20, 22 are attached. Other features of the apparatus 10, such as various electro-mechanical and mechanical components of the apparatus 10, may also couple with the structure 18. The structure 18 may be substantially unitary or may include a plurality of components affixed with one another via fastening hardware, adhesives, or the like. For example, the structure 18 may include a housing 24 having a pair of housing members 26, a plurality of mounting blocks 28, 30, and a dispenser tube 32. The pair of actuators 20, 22 may include a first actuator 20, or shuttle actuator, and a second actuator 22, or installation actuator, that are each coupled to the structure 18. The first actuator 20 may couple with the structure 18 via a first mounting block 28 disposed along a lower portion 34 of the structure 18, and the second actuator 22 may be coupled between the mounting plate 16 and the structure 18, thereby providing mechanical linkage between the robotic arm 14 and the structure 18.

The first mounting block 28 is disposed between the second actuator 22 and the pair of housing members 26, as well as between the pair of housing members 26 and the dispenser tube 32. For example, as will be described further herein, the dispenser tube 32 may be mounted to the first mounting block 28 at a first end 38 of the first mounting block 28, the first actuator 20 may be mounted to the first mounting block 28 at a second end 40, opposite the first end 38, of the first mounting block 28, and the pair of housing members 26 may couple with a top portion of the first mounting block 28. As will also be described further herein, the pair of housing members 26 may have mirrored features of one another, such as in a right-hand-left-hand configuration. The right-hand-left-hand pieces may together form a first interior space that allows the fasteners 12 to pass through the pair of housing members 26 and into the first mounting block 28, which may further form a second interior space in communication with the first interior space. These features will further be described in detail in reference to the proceeding figures.

Still referring to FIGS. 1-3, a second mounting block 30 may be provided toward an upper portion 36 of the structure 18 to secure a feeder 44, such as a feed tube 46, to the apparatus 10. The feed tube 46 provides the fasteners 12, or clips, to the apparatus 10 based on an accumulation level of clips 12 in the structure 18, as will be further described herein. Thus, the second mounting block 30 may be operable as a clamp 30 that is configured to engage a wall of the feed tube 46, which may be made of an elastic, elastomeric, polymer, or other flexible material, to secure the feed tube 46 to the structure 18. The structure 18 may further include a guard 48, which may be made of metal, such as sheet-metal, that may serve as a casing 50 for housing various conduits, such as pneumatic and/or electrical conduits for connection to the various control components of the apparatus 10.

Figure 4:
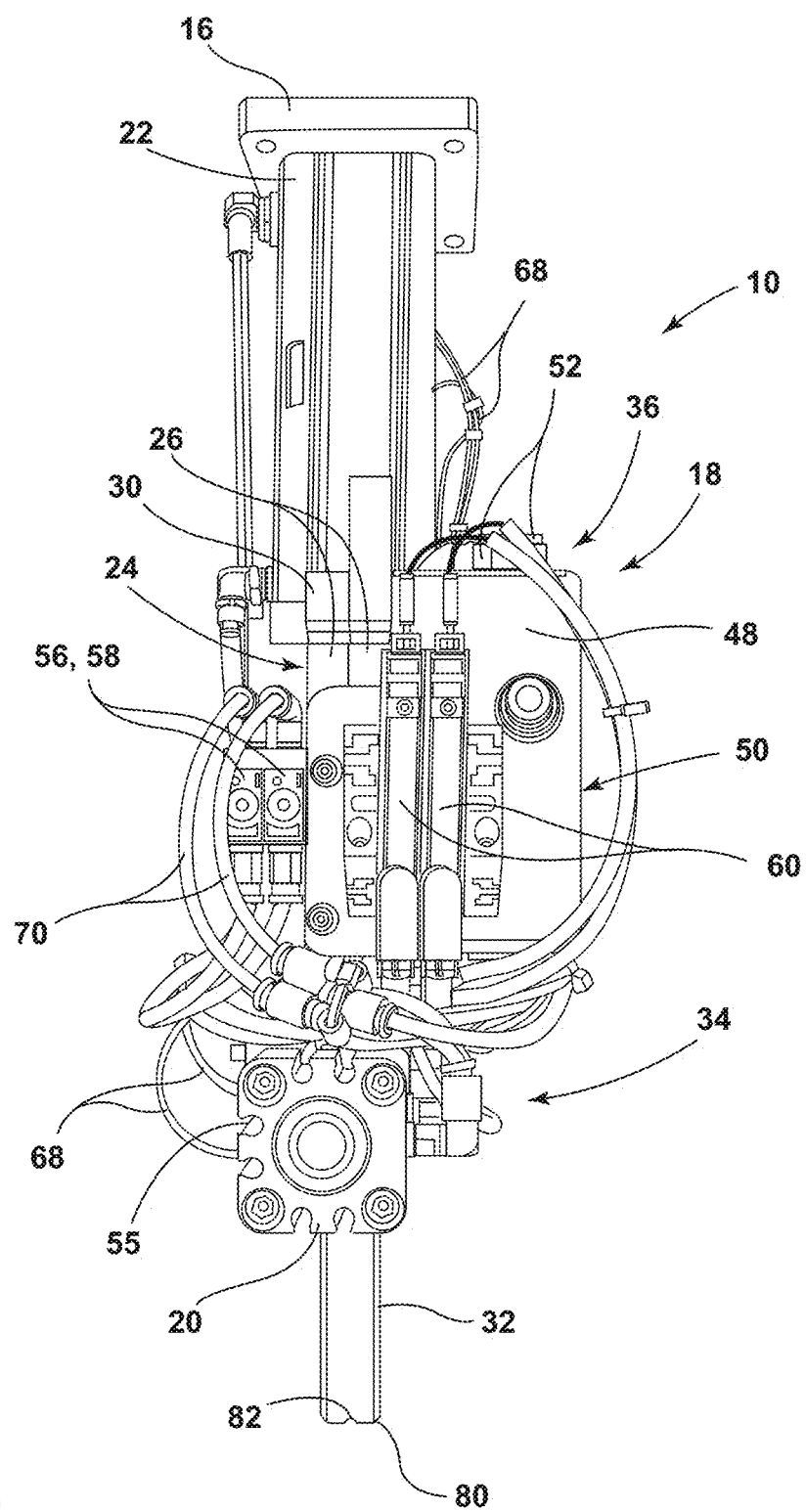
FIG. 4 is a front perspective view of the clip installation apparatus incorporating various pneumatic and electrical connections according to one aspect of the present disclosure.
Figure 5:
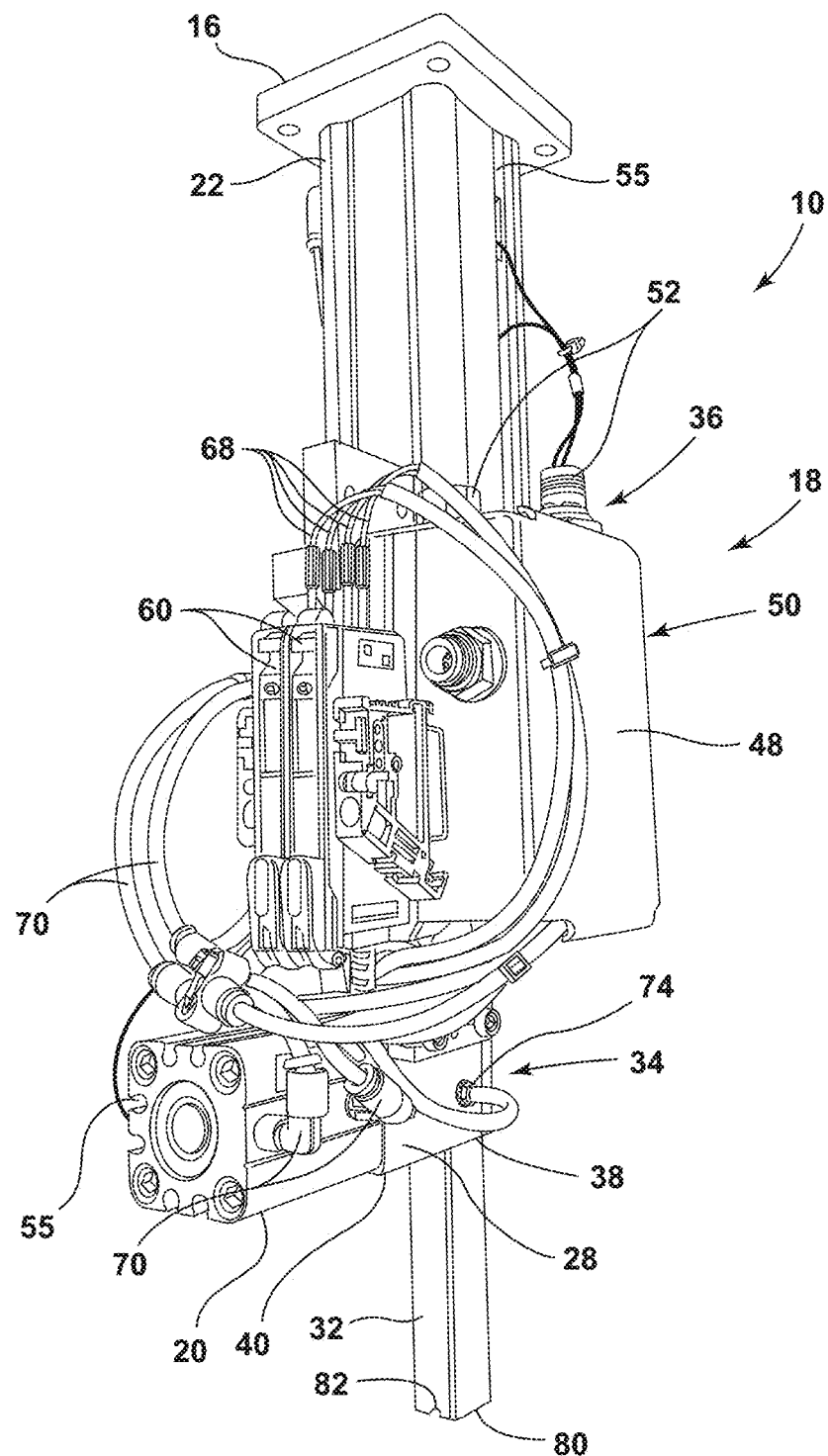
FIG. 5 is a side perspective view of the clip installation apparatus of FIG. 4.
Figure 6:
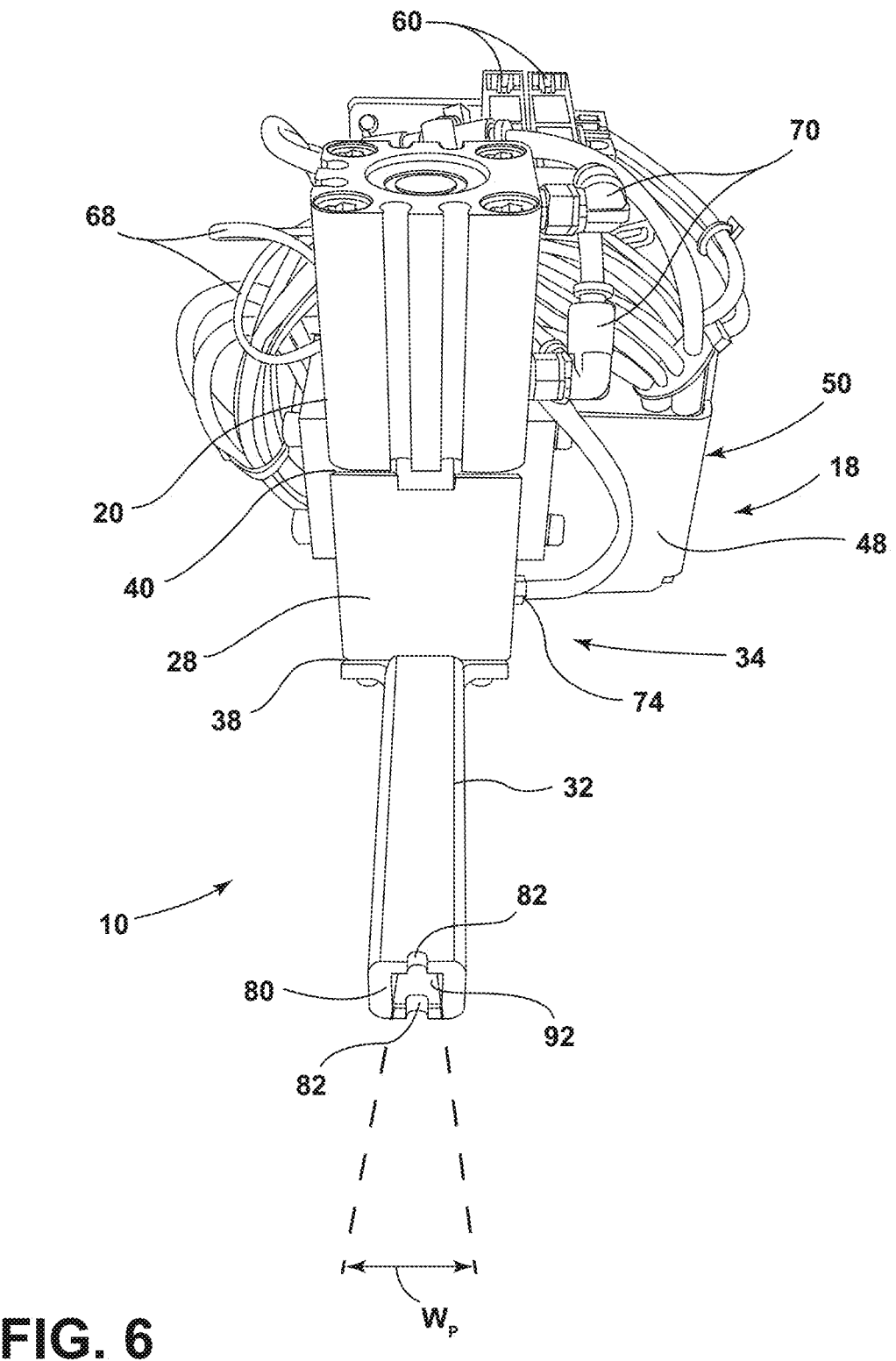
FIG. 6 is a lower perspective view of the apparatus illustrated in FIG. 4.

For example, with reference to FIGS. 4-6, one or more electrical connectors 52 may be disposed on the guard 48 and be configured to convert cables carrying multiple control wires into individual electrical conductors 54 for connection with the electrical control components further described herein. Such electrical conductors 54 may extend between inside of the casing 50 and electrical components of the apparatus 10, such as limit switches 55, relays, and/or output devices of the apparatus 10. For example, mounted to the structure 18 may be a pair of solenoid valves 56, 58 electrically actuated via the electrical conductors 54 that extend between the solenoid valves 56, 58 and the electrical connectors 52. The pair of solenoid valves 56, 58 may include a first solenoid valve 56 for controlling actuation of the first actuator 20 and a second solenoid valve 58 for controlling actuation of the second actuator 22. Further, a pair of signal amplifiers 60 may be electrically coupled with the electrical connectors 52 via the electrical conductors 54 extending between the signal amplifiers 60 and the electrical connectors 52. Thus, electrical inputs and outputs for the apparatus 10 may be communicated between the apparatus 10 and a controller 62 spaced from the apparatus 10, such as a programmable logic controller, as will be further described in reference to FIG. 10.

According to some examples of the present disclosure, the first and second actuators 20, 22 may include or be pneumatic cylinders 20, 22 configured to selectively actuate a piston (FIG. 7) between an extended position and a retracted position (e.g., a first piston 64 for the first pneumatic cylinder 20 and a second piston 66 for the second pneumatic cylinder 22), as will be described further in relation to the proceeding figures. Various sensors, such as the limit switches 55, may be provided with the pneumatic cylinders 20, 22 to track the position of the pistons 64, 66 of the cylinders 20, 22. The limit switches 55 may be communicatively coupled with the controller 62 and serve as feedback to the controller 62 to indicate proper operation of the cylinders 20, 22.

Figure 7:
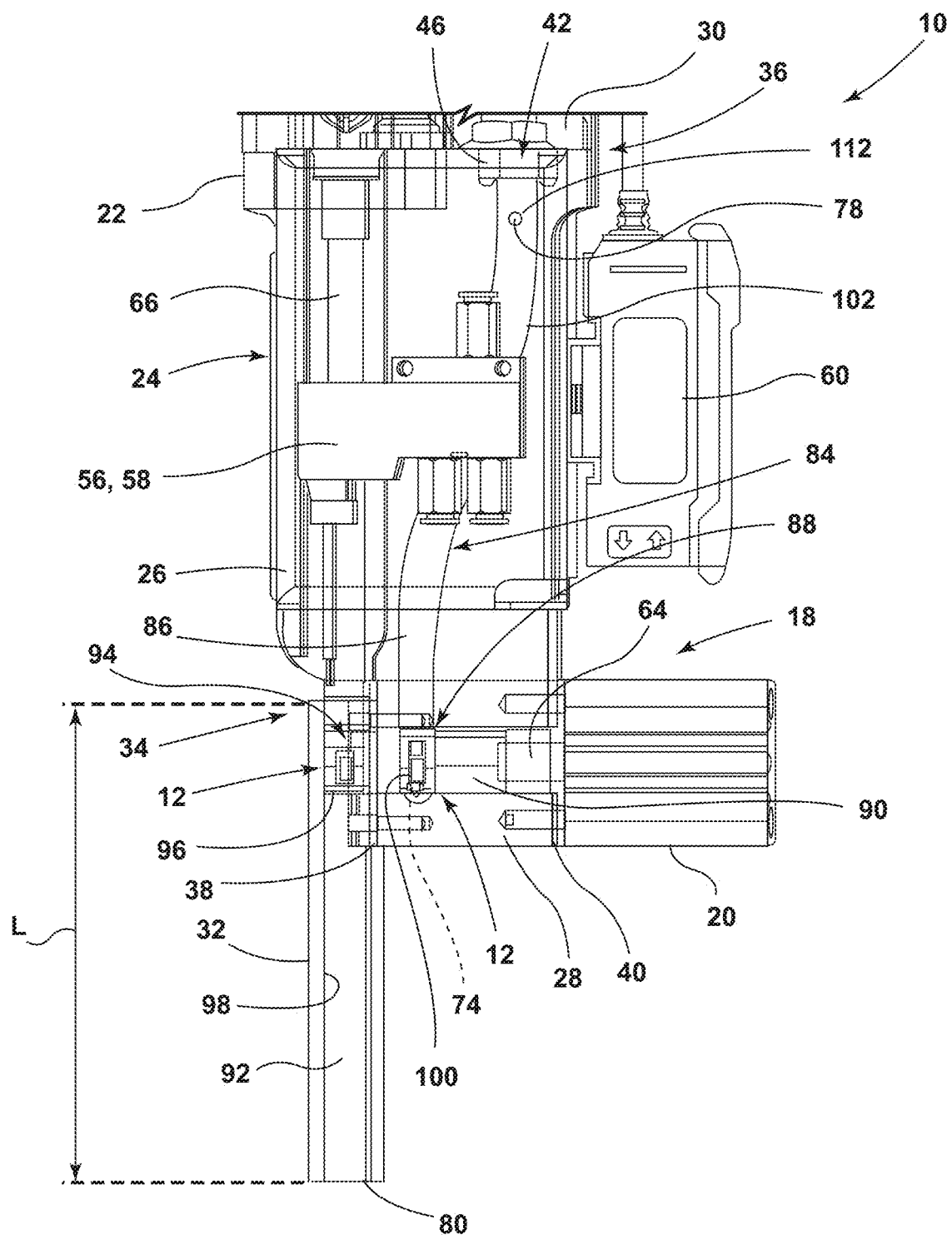
FIG. 7 is a side view of a clip installation apparatus illustrating internal components thereof according to one aspect of the present disclosure.

Referring to FIGS. 5-7, wiring 68 and tubing 70 may be provided between the various pneumatic and electrical portions of the apparatus 10, respectively. For example, the tubing 70 may be configured to transfer pressurized air between solenoid valves 56, 58 and the first and second actuators 20, 22. The wiring 68 may house the electrical conductors 54 previously described, and may couple with the various limit switches 55 installed on the pneumatic cylinders 20, 22 as previously described. It is further contemplated that the tubing 70 may also be configured for transfer of electrical signals, such is the case for a first sensor 72 (FIG. 10) operably coupled with the first mounting block 28 at a first region 74.

For example, as depicted in FIG. 5, a connection for the first sensor 72 is illustrated toward the first end 38 of the second mounting block 30 is configured to detect the presence or absence of one of the fasteners 12 in the first mounting block 28, though in the illustrated examples is concealed by the casing 50, a second sensor 76 (FIG. 10) may also be provided to detect the presence or absence of one or more of the fasteners 12 toward the upper portion 36 of the structure 18. For example, the second sensor 76 may be a proximity sensor using ultrasonic sound, or infrared light to detect a fastener 12 at a second region 78 of the structure 18, further described and shown in reference to FIGS. 8 and 9. As will further be described herein, the first and second sensors 72, 76 may provide feedback to the controller 62 to allow for predetermined loading of the fasteners 12 in the structure 18 and dispensing of the fasteners 12 through the dispenser tube 32.

Referring now more particularly to FIG. 6, the exit 80 of the structure 18 may be generally rectangular in shape and substantially free from articulating jaws to limit obstruction of the exit 80 during deployment of the fasteners 12. As will be described herein, the exit 80 may have a cross-sectional width WE that is less than a cross-sectional width WE of the fasteners 12 in an expanded position of the fasteners 12 to cause the fasteners 12 to compress, thereby limiting the fasteners 12 from falling out of or freely moving within the dispenser tube 32 (FIG. 2). In this way, the fasteners 12 may be held within the dispenser to advance through the dispenser tube 32 when engaged by the second piston 66, as will be further described herein, in relation to FIGS. 7-9. As will also be described further below, the fasteners 12 may be made of a flexible material that causes the fasteners 12 to exert a lateral outward force against the dispenser tube 32 to limit lateral movement of the fasteners 12. Thus, the cross-sectional widths of the various internal regions that contain the fasteners 12 may be dimensioned to squeeze the fasteners 12 in some positions (e.g., as the fasteners 12 are pushed through the dispenser tube 32) and loosely guide the fasteners 12 in other positions within the structure 18 (in preloading positions). The exit 80 may define at least one alignment feature, such as a pair of notches 82, extending into the dispenser tube 32. Accordingly. The dispenser tube 32 may include the alignment features, with the notches 82 configured to receive one or more bosses, or protrusions, on the working part to align the working part with the dispenser tube 32 at the exit 80. In this way, the fasteners 12 may be installed to an installation area on the working part with enhanced precision.

Figure 8:
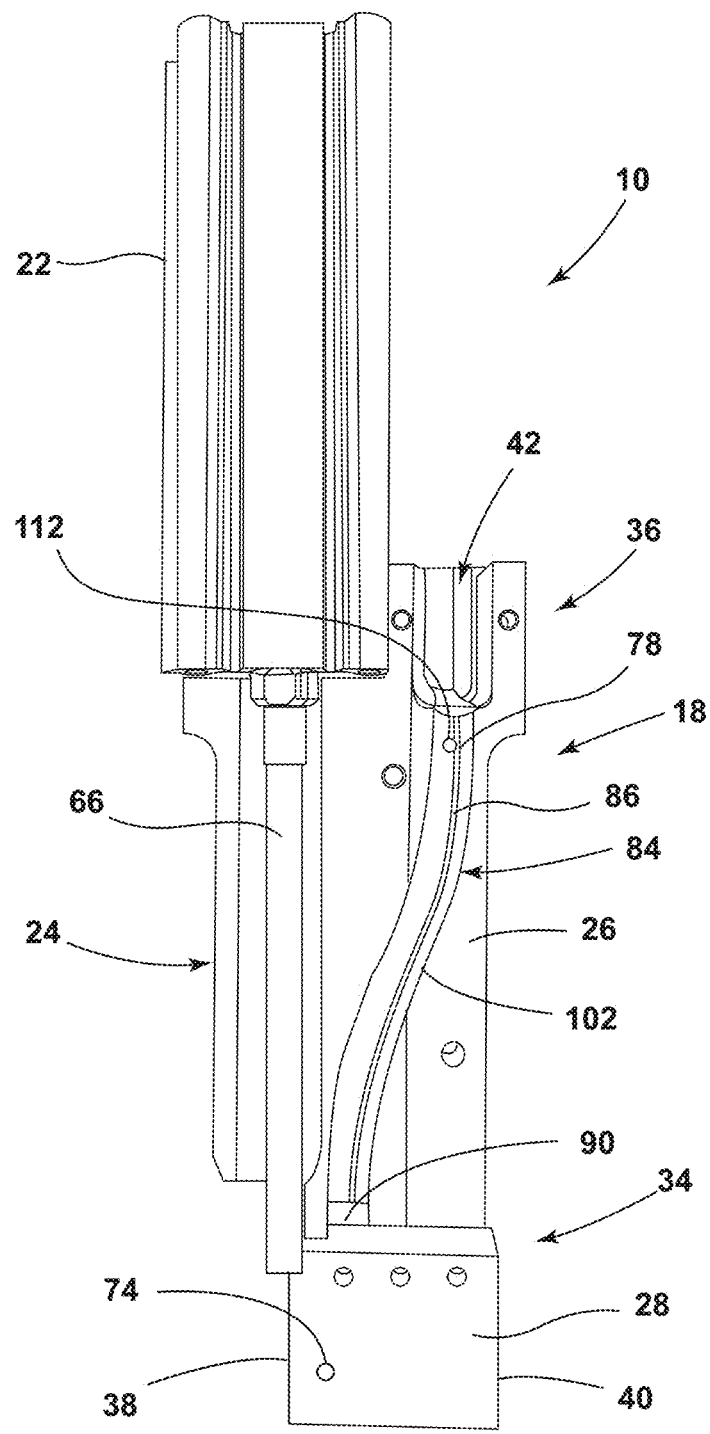
FIG. 8 is a partially disassembled side view of a structure of a clip installation apparatus operably coupled with a pneumatic cylinder of a clip installation apparatus constructed according to one example of the present disclosure.
Figure 9:
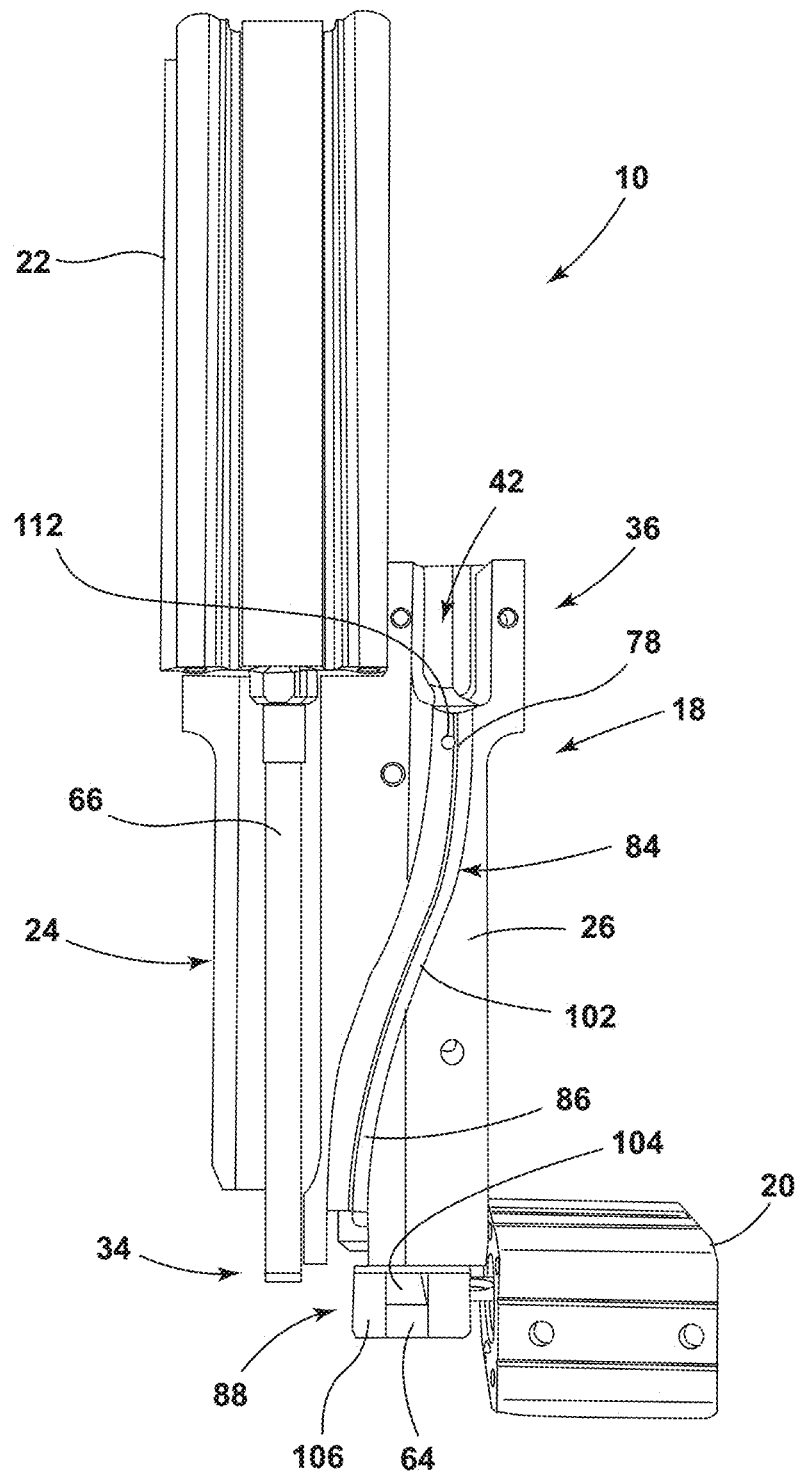
FIG. 9 is a partially disassembled view of a structure operably coupled with two pneumatic cylinders for a clip installation apparatus according to one example of the present disclosure.

Referring now to FIGS. 7-9, the process of moving the fasteners 12 through the apparatus 10 will be described in relation to a pathway, or channel 84 that extends through the structure 18 of the apparatus 10 and allows for accumulation, loading, and deployment of the fasteners 12. For example, the structure 18, in addition to having the exit 80 previously described, includes the entry 42 for the fasteners 12 disposed near the upper portion 36 at the feed tube 46. The channel 84 includes a chute 86 that extends through/between the pair of housing members 26 and is configured to receive a stack of the fasteners 12 between the entry 42 of the channel 84 and a staging position 88 for the clips 12 in the first mounting block 28. The channel 84 further includes a chamber 90 defined by the first mounting block 28 and extending between the second actuator 22 and the dispensing tube 32. The channel 84 also includes a passage 92 defined by the dispensing tube 32 and extending along a length L of the dispensing tube 32. The channel 84 is in communication with the chute 86 by way of the passage 92 being disposed between the chute 86 and the channel 84.

Still referring to FIG. 7, the first actuator 20, which is operably coupled with the structure 18 via the first mounting block 28, is configured to move the fasteners 12 from the staging position 88 in the chamber 90 to a loading region 94, or pocket, in the passage 92. The first piston 64 may have a proportional cross-section to the cross-section of the fastener 12. For example, the fasteners 12 may have substantially A-shaped profiles, and the first piston 64, or an end of the first piston 64, may have a slightly smaller A-shaped cross-section, such that engagement of the first piston 64 with the fastener 12 further results in guiding the fasteners 12 through the chamber 90 and into the passage 92. In operation, an extension and retraction cycle of the first piston 64 may result in loading of, for example, a first of a plurality of the fasteners 12 into the loading region 94 and allowing for a second of the plurality of fasteners 12 to fall into or otherwise be guided into the chamber 90 at the staging position 88 upon retraction of the first piston 64.

With continued reference to FIG. 7, the loading position 94 of the passage 92 may have a floor 96 upon which the fastener 12 rests prior to being pushed through the passage 92. The passage 92 may include a peripheral wall 98 that is coupled with the floor 96 and has a cross-sectional width that is substantially the same as the cross-sectional width Wp of the exit 80 previously described throughout at least a portion of the passage 92. In some examples, the passage 92 has the same cross-sectional width as the cross-sectional width Wp of the exit 80 between the exit 80 and the loading position 94. For example, the fastener 12 may be configured to rest in an un-deformed state in the loading position 94 where the cross-sectional width of the inside of the dispenser tube 32 is at least the width of the clip 12 in the undeformed, or expanded, position, and the floor 96 may be tapered or otherwise have a gradient to transition the cross-sectional width Wp of the passage 92 at the loading region 94 to the cross-sectional width Wp at the exit 80. In this way, when the second piston 66 engages the fastener 12, the fastener 12 may compress, or elastically deform, due to engagement of a pair of legs 100 of the clip 12 with the tapered surface of the floor 96 and may therefore be squeezed between the peripheral wall 98 as the second piston 66 moves through the passage 92 during the insertion process of the fastener 12.

Referring now to FIGS. 8 and 9, details of one half of the pair of housing members 26 is generally illustrated demonstrating the geometry of the chute 86 and the entry 42 for the fasteners 12. Although the particular geometry between the entry 42 and the loading region 94 of the chamber 90 may be any shape configured to accumulate the fasteners 12 without resulting in jamming of the fasteners 12 in the chamber 90, the exemplary geometry includes an arcuate bend 102 between the entry 42 and the chamber 90. The arcuate bend 102 may be sinusoidal in shape along a height of the housing 24 and may have a rectangular cross-sectional shape having a width slightly larger than or substantially equal to the width WE of the fastener 12 to allow the fasteners 12 to pass through and be guided by the chute 86 without causing a jam in the chute 86. Similarly, the chamber 90 may have a cross-sectional width that is slightly larger than or substantially equal to the width WE of the fastener 12 to allow the fasteners 12 to be guided through the chamber 90. It is contemplated that the geometry of the chute 86 may limit jamming of the clips 12 in the chamber 90 by providing some resistance to gravity and/or air pressure pushing the clips 12 into the chamber 90. For example, because the chute 86 may not be a linearly vertical shape between the entry 42 and the chamber 90, clips 12 may be limited from falling into the chamber 90 during a stroke of the first pneumatic cylinder 20.

Referring now more particularly to FIG. 9, a geometry of the first piston 64 is generally illustrated with an upper tapered portion 104 and a lower flattened portion 106. The upper tapered portion 104 and the lower flattened portion 106 may result in a cross-sectional shape of the end of the first piston 64 having an A-shaped geometry that is proportional to the cross-sectional geometry of the fastener 12. In this way, when the first piston 64 engages the fastener 12 to push the fastener 12 into the loading region 94, the first piston 64 generally aligns the fastener 12 in the chamber 90 to limit the fastener 12 from being rotated or rolled through the chamber 90 into the loading region 94.

Referring back to FIGS. 2 and 3, the second actuator is attached to the structure 18 (one or both of the pair of housing members 26) and operably coupled with the dispenser tube 32. The second piston 66 is illustrated engaging the clip 12 in an extended position, with an end of the second piston 66 protruding from the dispenser tube 32. In operation, the clip 12 is pushed out of the dispenser tube 32 as the second piston 66 ends its stroke. It is contemplated that the end of the second piston 66 may be contoured to an outer surface of each clip 12 to align the clip 12 as the second piston 66 pushes the clip 12 through the dispenser tube 32. For example, the clip setter (e.g., the end of the second piston 66) may have a wedged shape to be configured to mate with a triangular geometry of the clip 12 to limit lateral movement of the clip 12 through the passage 92 and out of the exit 80 of the passage 92. It is also contemplated that the various structural components (e.g., the structure 18) described herein may be primarily formed of metal, such as aluminum, steel, or the like, and that security features such as bolts, rivets, or the like may hold various portions of the structure 18 together.

As illustrated in the present examples, the passage 92 may extend substantially vertically when the fastener 12 is disposed in the passage 92, and the chamber 90 may extend substantially perpendicularly to the passage 92. It is contemplated that other angles, such as oblique angles, may be formed between the chamber 90 and the passage 92 in other examples. It is also contemplated the chute 86 extends generally or substantially vertically from the entry 42 to the chamber 90, such that the path of the clips 12 includes two significant turns (e.g., downward movement, lateral movement, then downward movement), though any movement allowing for accumulation and insertion of the present fasteners 12 may be employed.

Figure 10:
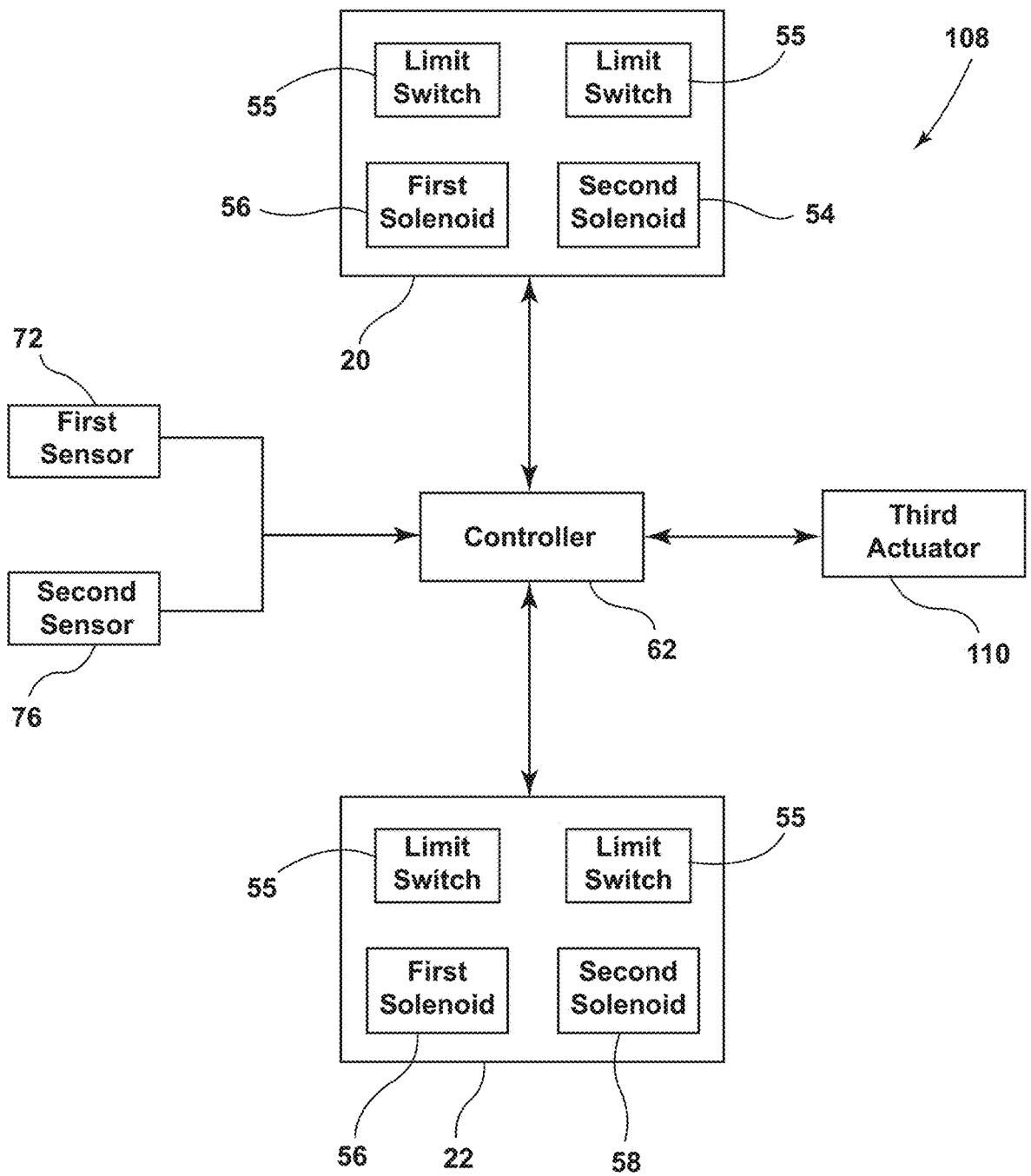
FIG. 10 is a block diagram of a control system for a clip installation apparatus illustrating electrical communication between various components of the installation apparatus according to one aspect of the present disclosure.

Referring now to FIG. 10, the present apparatus 10 may be used in communication with or may include a control system 108 configured to operate the first and second actuators 20, 22 based on instructions stored in a memory of the controller 62 and executed via a processor of the controller 62. For example, the controller 62 may be in communication with the first actuator 20, the second actuator 22, a third actuator 110 that controls supply of the fasteners 12 to the apparatus 10, and a plurality of part detection sensors 74, 76. For example, the plurality part detection sensors 74, 76 may include the accumulation sensor 76 and the staging sensor 74 for detecting the fastener 12 at the entry 42 and at the loading region 94, respectively. Referring back to FIG. 8, the second sensor 76, or accumulation sensor 76, may be an optical sensor that detects the presence or absence of light through a hole 112 near the entry 42 of the channel 84 which may be blocked when a fastener 12 is disposed between the second sensor 76 and the hole 112 to signify the presence of a fastener 12 at the entry 42. Based on the presence of the fastener 12 at the entry 42, the controller 62 may determine that the chute 86 is full of clips 12 and communicate instructions and/or signals to control the third actuator 110 to energize or de-energize a valve, for example, to cause a fastener 12 to be loaded into the chute 86. For example, the valve may be a shut-off valve that selectively blocks a blow feeder 44 of the feed tube 46. Referring briefly to FIGS. 3, 5, and 6, the first sensor 72 disposed at the second region 78 may also, or alternatively, be an optical sensor configured to detect the presence or absence of the fastener 12 in the loading position 94.

Operation of the clip insertion apparatus 10 will now be described with respect to a pair of the plurality of fasteners 12 moving through the apparatus 10. In operation, the plurality of fasteners 12 accumulate in the chute 86 between the entry 42 and the chamber 90, with a first of the plurality of fasteners 12 being disposed in the staging position 88 of the chamber 90. For example, the controller 62 may communicate a signal to the third actuator 110 to allow the fasteners 12 to be loaded into the chute 86 until or after the accumulation sensor 76 is flagged on. In response to the accumulation sensor (the second sensor 76) detecting a fastener 12 at the entry 42, the controller 62 may communicate a signal to shut the third actuator 110 off. The controller 62 may further be in communication with other autonomous systems, such as the robotic arm 14 previously described to determine execution of a clip insertion routine stored in the memory of the controller 62.

Upon execution of the clip insertion routine, the controller 62 may communicate a signal to control the first actuator 20. For example, the controller 62 may communicate a signal to energize the first solenoid valve 56 to extend the first piston 64 to move the first clip of the plurality of clips 12 through the chamber 90 and into the passage 92. In particular, the second actuator 22 may be configured to move the first clip into the loading region 94 of the passage 92. The shuttle cylinder (e.g., the first actuator 20) may then be retracted via the controller 62 communicating a signal to the first solenoid valve 56 to cause the second clip of the plurality of clips 12 to fall into the staging region 88. During the retraction, or after movement of the first clip into the loading region 94, the second actuator 22 is configured to extend to cause the first clip to be pushed through the passage 92 of the dispenser tube 32 and exit 80 to be installed on the working part. Upon retraction of the second actuator 22, the controller 62 may communicate a signal to control the first actuator 20 to extend again to feed the second clip of the plurality of clips 12 into the loading region 94. In this way, the installation cycle may be recursive and allow for shortened cycle times for installation of clips 12 into the working part.

In general, the present apparatus 10 may provide for an automated system that eliminates the waiting period for new clips by staging the clips 12 within the apparatus 10 itself. Further, the present apparatus 10 may limit moving components, such as articulating jaws at the exit 80, to increase a lifespan of the apparatus 10 and allow for a slim design. In this way, the apparatus 10 may access confined spaces that may be inaccessible by systems incorporating articulating jaws at the exit 80. The apparatus 10 may also provide for maintaining the fasteners 12 near the point of installation, eliminating articulating jaws, and providing the necessary geometry (e.g., cross sections of the dispenser tube 32 and the clips 12) to align the clips 12 during insertion. The present apparatus 10 may further limit jamming or other adverse events within the structure 18 and at the point of installation. Further, the present apparatus 10 provides for a slim design that allows for accumulation of the clips 12 within the apparatus 10 itself.

According to one aspect of the present disclosure, an apparatus for installing a fastener includes a structure having an entry and an exit for the fastener. The structure further defines a channel having a passage, a chute for receiving the fastener, and a chamber between the chute and the passage. A feeder is operably coupled with the chute and configured to provide the fastener at the entry. A first actuator is operably coupled with the structure and configured to move the fastener through the chamber. A second actuator is operably coupled with the housing and configured to move the fastener through the passage to the exit.

According to some aspects of the present disclosure, the fastener is elastically deformable between a compressed position and an expanded position, wherein a width of the passage is less than a width of the fastener in the expanded position.

According to some aspects of the present disclosure, the passage includes a peripheral wall that engages the fastener in the compressed position to align the fastener with the exit.

According to some aspects of the present disclosure, the passage extends substantially vertically when the fastener is disposed in the passage.

According to some aspects of the present disclosure, the chamber extends substantially perpendicularly to the passage.

According to some aspects of the present disclosure, the chute includes an arcuate bend between the entry and the chamber.

According to some aspects of the present disclosure, the channel is configured to house a plurality of clips in the chute, and wherein the chute extends substantially vertically.

According to some aspects of the present disclosure, a sensor mounted adjacent the entry configured to detect one of the plurality of clips. According to some aspects of the present disclosure, a third actuator configured to control movement of the one of the plurality of clips toward the entry. According to some aspects of the present disclosure, a controller in communication with the sensor and the third actuator, the controller configured to communicate a signal to control the third actuator based on feedback from the sensor.

According to some aspects of the present disclosure, the controller is further in communication with the first and second actuators, the controller further configured to communicate a signal to selectively extend the first actuator to move a first clip of the plurality of clips into the passage and selectively retract the first actuator to allow a second clip of the plurality of clips to move into the chamber.

According to some aspects of the present disclosure, the controller is further configured to communicate a signal to selectively extend the second actuator to move the first clip toward the exit and selectively retract the second actuator to provide a pocket to receive the second clip from the chamber.

According to another aspect of the present disclosure, an apparatus for installing a fastener includes a structure having an entry and an exit for the fastener. The structure further defines a channel having a passage, a chute for receiving the fasteners, and a chamber between the chute and the passage. A first pneumatic cylinder is configured to push the fastener through the chamber. A second pneumatic cylinder is configured to push the fastener through the passage to the exit. The fastener is elastically deformable between a compressed position and an expanded position. A width of the passage is less than a width of the fastener in the expanded position.

According to some aspects of the present disclosure, the passage includes a peripheral wall that engages the fastener in the compressed position to align the fastener with the exit.

According to some aspects of the present disclosure, wherein the structure includes a dispenser tube that defines the passage and includes an alignment feature for aligning the fastener with a working part configured to receive the fastener.

According to some aspects of the present disclosure, the chamber extends substantially perpendicularly to the passage.

According to some aspects of the present disclosure, a feeder operably coupled with the chute and configured to provide the fasteners at the entry.

According to some aspects of the present disclosure, the chute includes an arcuate bend between the entry and the chamber.

According to some aspects of the present disclosure, the channel is configured to house a plurality of clips in the chute.

According to some aspects of the present disclosure, the first actuator is configured to selectively extend to move a first clip of the plurality of clips into the passage and selectively retract to allow a second clip of the plurality of clips to move into the chamber.

According to another aspect of the present disclosure, a clip installation machine includes a structure having an entry and an exit for a plurality of clips. The structure further defines a channel having a passage, a chute accumulating the plurality of clips, and a chamber between the chute and the passage. A feeder is operably coupled with the chute and configured to load the plurality of clips into the chute. A first actuator is operably coupled with the structure and configured to selectively extend to move a first clip of the plurality of clips into the passage and retract to allow a second clip of the plurality of clips to move into the chamber. A second actuator is nonparallel with the first actuator and is configured to selectively extend to move the first clip toward the exit. Each of the plurality of clips is elastically deformable between a compressed position and an expanded position. A width of the passage is less than a width of each of the plurality of clips in the expanded position.

According to some aspects of the present disclosure, the passage includes a peripheral wall that engages each of the plurality of clips in the compressed position to align each of the plurality of clips with the exit.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An apparatus for installing a fastener, the apparatus comprising:
   a structure having an entry and an exit for the fastener, the structure further defining a channel having a passage, a chute for receiving the fastener, and a chamber between the chute and the passage;
   a feeder operably coupled with the chute and configured to provide the fastener at the entry;
   a first actuator operably coupled with the structure and configured to move the fastener through the chamber; and
   a second actuator operably coupled with the structure and configured to move the fastener through the passage to the exit; wherein the fastener is elastically deformable between a compressed position and an expanded position, wherein a width of the passage is less than a width of the fastener in the expanded position.

2. The apparatus of claim 1, wherein the passage includes a peripheral wall that engages the fastener in the compressed position to align the fastener with the exit.

3. The apparatus of claim 2, wherein the passage extends substantially vertically when the fastener is disposed in the passage.

4. The apparatus of claim 1, wherein the chamber extends substantially perpendicularly to the passage.

5. The apparatus of claim 1, wherein the chute includes an arcuate bend between the entry and the chamber.

6. The apparatus of claim 1, wherein the channel is configured to house a plurality of clips in the chute, and wherein the chute extends substantially vertically.

7. The apparatus of claim 6, further comprising:
   a sensor mounted adjacent the entry configured to detect one of the plurality of clips;
   a third actuator configured to control movement of the one of the plurality of clips toward the entry; and
   a controller in communication with the sensor and the third actuator, the controller configured to communicate a signal to control the third actuator based on feedback from the sensor.

8. The apparatus of claim 7, wherein the controller is further in communication with the first and second actuators, the controller further configured to communicate a signal to selectively extend the first actuator to move a first clip of the plurality of clips into the passage and selectively retract the first actuator to allow a second clip of the plurality of clips to move into the chamber.

9. The apparatus of claim 8, wherein the controller is further configured to communicate a signal to selectively extend the second actuator to move the first clip toward the exit and selectively retract the second actuator to provide a pocket to receive the second clip from the chamber.

10. The apparatus of claim 1, wherein the chute includes an arcuate bend between the entry and the chamber.

11. The apparatus of claim 1, wherein the channel is configured to house a plurality of clips in the chute.

12. The apparatus of claim 11, wherein the first actuator is configured to selectively extend to move a first clip of the plurality of clips into the passage and selectively retract to allow a second clip of the plurality of clips to move into the chamber.

13. An apparatus for installing a fastener, the apparatus comprising:
   a structure having an entry and an exit for the fastener, the structure further defining a channel having a passage, a chute for receiving the fasteners, and a chamber between the chute and the passage;
   a first pneumatic cylinder configured to push the fastener through the chamber; and
   a second pneumatic cylinder configured to push the fastener through the passage to the exit, wherein the fastener is elastically deformable between a compressed position and an expanded position, and wherein a width of the passage is less than a width of the fastener in the expanded position.

14. The apparatus of claim 13, wherein the passage includes a peripheral wall that engages the fastener in the compressed position to align the fastener with the exit.

15. The apparatus of claim 14, wherein the structure includes a dispenser tube defining the passage and including an alignment feature for aligning the fastener with a working part configured to receive the fastener.

16. The apparatus of claim 13, wherein the chamber extends substantially perpendicularly to the passage.

17. The apparatus of claim 13, further comprising:
   a feeder operably coupled with the chute and configured to provide the fasteners at the entry.

18. A clip installation machine comprising:
   a structure having an entry and an exit for a plurality of clips, the structure further defining a channel having a passage, a chute accumulating the plurality of clips, and a chamber between the chute and the passage;

a feeder operably coupled with the chute and configured to load the plurality of clips into the chute;

a first actuator operably coupled with the structure and configured to selectively extend to move a first clip of the plurality of clips into the passage and retract to allow a second clip of the plurality of clips to move into the chamber; and a second actuator nonparallel with the first actuator and configured to selectively extend to move the first clip toward the exit, wherein each of the plurality of clips is elastically deformable between a compressed position and an expanded position, and wherein a width of the passage is less than a width of each of the plurality of clips in the expanded position.

19. The clip installation machine of claim 18, wherein the passage includes a peripheral wall that engages each of the plurality of clips in the compressed position to align each of the plurality of clips with the exit.

* * * * *